US012783732B1

(12) United States Patent
Sanchez et al.

(10) Patent No.: US 12,783,732 B1
(45) Date of Patent: Nov. 3, 2026

(54) SYSTEMS AND METHODS FOR MANAGING USER DATA COLLECTION

(71) Applicant: GEN DIGITAL INC., Tempe, AZ (US)

(72) Inventors: Iskander Sanchez, Redwood City, CA (US); Lei Gu, Bedford, MA (US)

(73) Assignee: Gen Digital Inc., Tempe, AZ (US)

( * ) Notice: Subject to any disclaimer, the term of this patent is extended or adjusted under 35 U.S.C. 154(b) by 57 days.

(21) Appl. No.: 18/925,397

(22) Filed: Oct. 24, 2024

(51) Int. Cl.
*G06F 21/62* (2013.01)
*G06F 16/951* (2019.01)

(52) U.S. Cl.
CPC ........ *G06F 21/6263* (2013.01); *G06F 16/951* (2019.01)

(58) Field of Classification Search
CPC ... G06F 21/6263; G06F 16/951; H04L 67/02; H04L 63/168; H04L 67/568
See application file for complete search history.

(56) References Cited

U.S. PATENT DOCUMENTS

| | | | | |
|---|---|---|---|---|
| 8,285,704 | B2 * | 10/2012 | Waters | G06F 16/951 709/224 |
| 9,712,552 | B2 * | 7/2017 | Bailey, Jr. | H04L 67/12 |
| 11,481,500 | B2 * | 10/2022 | Song | G06F 16/951 |
| 12,081,550 | B1 * | 9/2024 | Zhang | H04L 63/101 |
| 12,149,415 | B2 * | 11/2024 | Aslam | H04L 61/4511 |
| 12,301,627 | B2 * | 5/2025 | Crabtree | H04L 63/1433 |
| 12,361,680 | B1 * | 7/2025 | Tao | G06V 20/50 |
| 12,381,786 | B2 * | 8/2025 | Aslam | G06Q 10/0635 |
| 12,470,589 | B2 * | 11/2025 | Sapir | H04L 63/105 |

* cited by examiner

*Primary Examiner* — Hosuk Song
(74) *Attorney, Agent, or Firm* — ALG Intellectual Property, LLC

(57) ABSTRACT

A computer-implemented method for managing user data collection may include analyzing one or more web pages of each of one or more companies by crawling the one or more web pages to find policy-related content, identifying collected user data that was collected by each of the one or more companies by analyzing the policy-related content, extracting data removal request information from the policy-related content, and performing a security action for the collected user data based on the data removal request information. Various other methods, systems, and computer-readable media are also disclosed.

20 Claims, 7 Drawing Sheets

SYSTEMS AND METHODS FOR MANAGING USER DATA COLLECTION

BACKGROUND

As users browse the Internet and visit web pages of companies, and sign up for various services, these companies may collect various data points, either passively and/or actively provided by the users. To better protect user data, certain regulatory requirements may require companies to provide notice of data collection (e.g., a privacy policy or policy), and/or options to control such data collection, including requesting removal (e.g., deletion) of collected data.

However, such options may not feasibly provide users control over their data. Users may visit numerous sites/companies (e.g., closer to a magnitude of a thousand over a lifetime) such that users may not be able to recall or otherwise track what sites they have visited. Even if the user were able to revisit every site, requesting data removal may be difficult, such as requiring reading posted policies to determine how to request data removal, browsing to difficult-to-find and use interfaces for controlling their data, etc. Moreover, such disparate options, particularly in view of the number of sites, prevent automated tools from assisting in data removal.

The present disclosure, therefore, identifies and addresses a need for systems and methods for managing user data collection.

SUMMARY

As will be described in greater detail below, the present disclosure describes various systems and methods for managing user data collection. Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the present disclosure.

Figure 1:
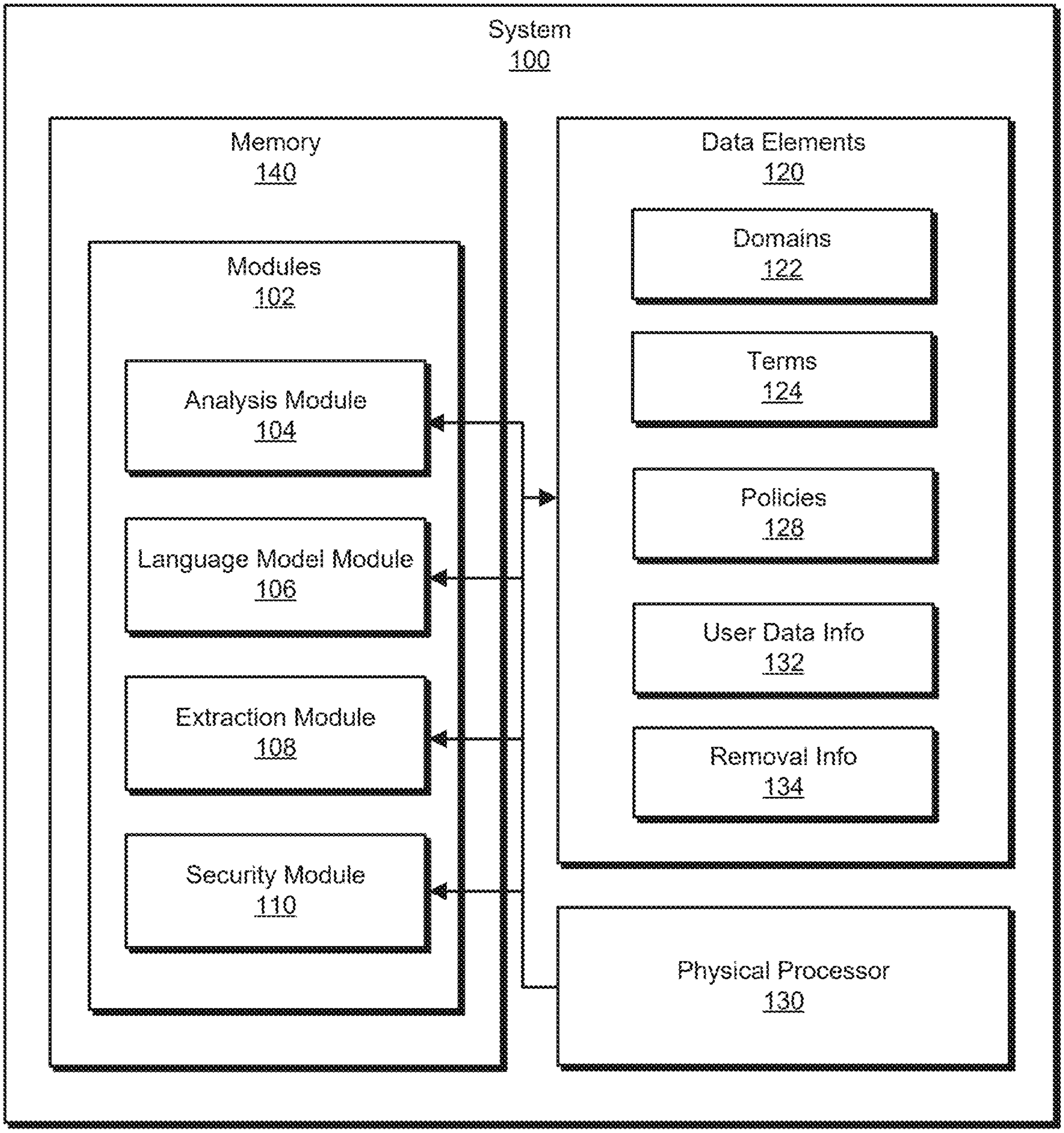
FIG. 1 is a block diagram of an example system for managing user data collection.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for managing user data collection. As will be explained in greater detail below, by analyzing web pages to find policy-related content, and identifying from the policy-related content what user data was collected and how to request removal of the collected user data, the systems and methods provided herein may improve automated detection of potential privacy concerns as well as provided automated responses for addressing the potential privacy concerns as compared to conventional solutions that may be limited to analyzing explicitly provided policy documents without providing any response options.

In addition, the systems and methods provided herein may improve web security and data protection technologies by providing specific rules to automate specific tasks that conventionally are not automated. For example, the systems and methods provided herein may allow automation of analyzing web pages to find policy documents, analyzing policy documents to find what data was collected and how to request removal thereof, and further providing automated responses to request removal or otherwise alert users, providing an end-to-end solution that is conventionally not previously performable by a computer.

Figure 2:
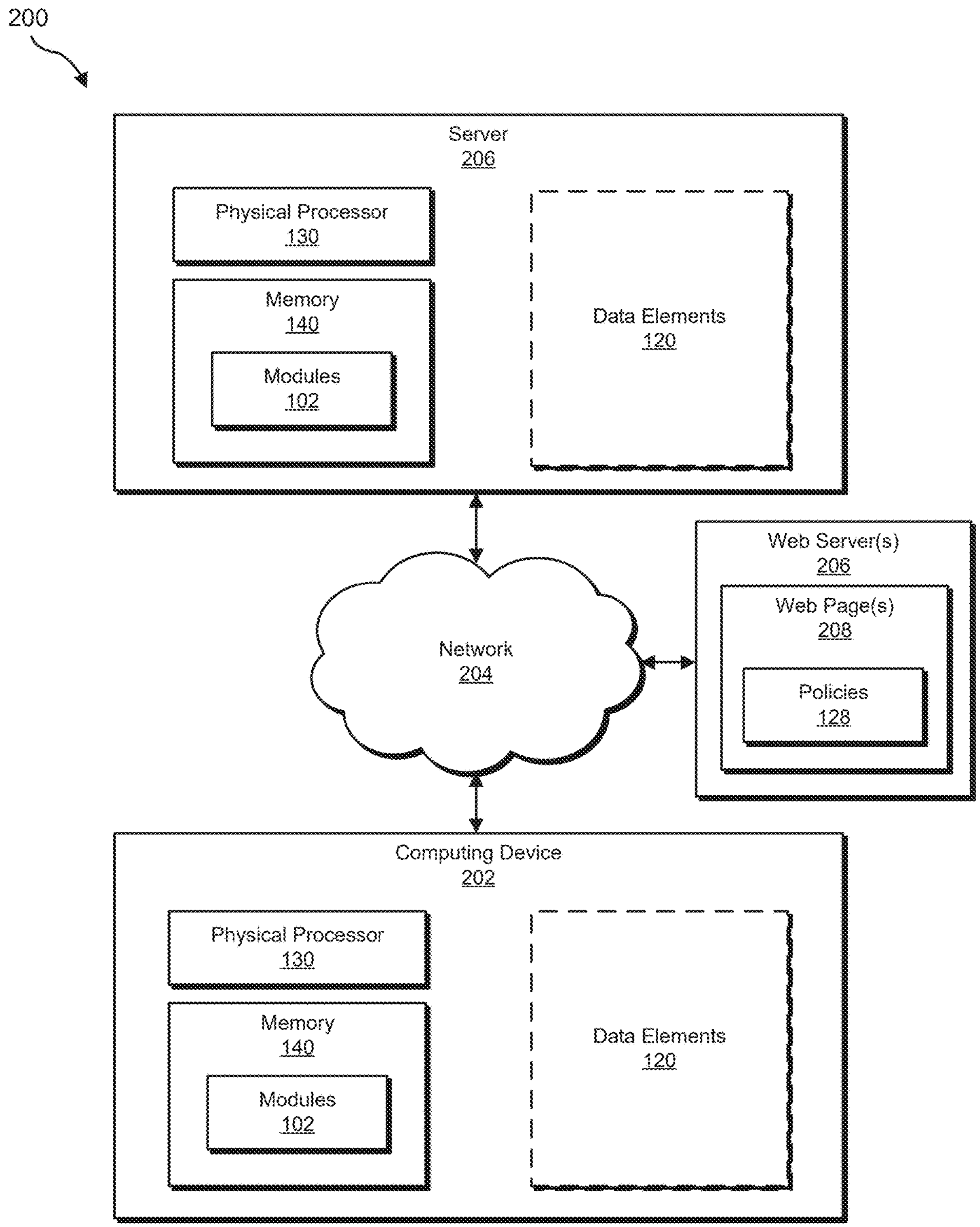
FIG. 2 is a block diagram of an additional example system for managing user data collection.

The following will provide, with reference to FIGS. 1-2, detailed descriptions of example systems for managing user data collection. Detailed descriptions of corresponding computer-implemented methods will also be provided in connection with FIG. 3. Detailed descriptions of a corresponding computer-implemented method will be provided in connection with FIG. 4. Detailed descriptions of an example crawling process will also be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for managing user data collection. As illustrated in this figure, example system 100 may include one or more modules 102 for performing one or more tasks. As will be explained in greater detail below, modules 102 may include an analysis module 104 (corresponding to ana analysis engine that may crawl web pages), a language model module 106 (corresponding to any machine learning model for probabilistic natural language processing), an extraction module 108 (corresponding to an engine for detecting certain information from documents and may interface with or otherwise be integrated with language model module 106), and a security module 110 (corresponding to an engine for performing security actions and/or other automated tasks based on certain trigger conditions). Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate managing user data collection. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more data elements, such as domains 122 (corresponding to a set of domains to be analyzed), terms 124 (corresponding to a set of terms for identifying specific information), policies 128 (corresponding to policy-related content), user data info 132 (corresponding to information on what user data was collected), and removal info 134 (corresponding to information on how to remove the user data indicated by user data info 132). Data elements 120 generally represents any type or form of data. Examples of domains 122 include, without limitation, domain names, URLs, company, merchant, service provider, organization, and/or other entity names, etc., which may be dynamically updated. Examples of terms 124 include, without limitation, terms relating to privacy policies (e.g., "privacy," "policy," "collect," "user data," "do not sell," "track," etc.), terms relating to user data (e.g., "email," "address," "street," "state," "province," "country," "postal code," "zip code," "card," "number," "name," etc.). Examples of policies 128 include, without limitation, privacy policies, cookie policies, cookie/browser tracking interfaces, etc. Examples of user data info 132 include, without limitation, terms related to user data as described herein. Examples of removal info 134 include, without limitation, email addresses, postal addresses, removal instructions, cookie/browser tracking interfaces, etc.

Example system 100 in FIG. 1 may be implemented in a variety of ways. For example, all or a portion of example system 100 may represent portions of example system 200 in FIG. 2. As shown in FIG. 2, system 200 may include a computing device 202 in communication with a server 206 via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to manage user collected data. For example, and as will be described in greater detail below, one or more of modules 102 may cause computing device 202 and/or server 206 to analyze one or more web pages (e.g., web page(s) 208 of web server(s) 206) of each of one or more companies by crawling the one or more web pages to find policy-related content (e.g., policies 128), identifying collected user data (e.g., user data info 132) that was collected by each of the one or more companies by analyzing the policy-related content, extracting data removal request information (e.g., removal info 134) from the policy-related content, and performing a security action for the collected user data based on the data removal request information.

Computing device 202 generally represents any type or form of computing device capable of reading computer-executable instructions. Computing device 202 may, in some examples, represent an endpoint or client device running client-side security software. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Server 206 generally represents any type or form of computing device that is capable of analyzing web pages. In some examples, server 206 may be a server hosting machine learning models, web crawlers, analysis engines, etc. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

One or more web server(s) 206 may generally represent one or more servers capable of hosting web pages (e.g., one or more web page(s) 208), such as company (or other organization) web pages (e.g., as indicated in domains 122).

Accordingly, web page(s) 208 may generally represent one or more websites that may include corresponding policy pages (e.g., policies 128).

Figure 3:
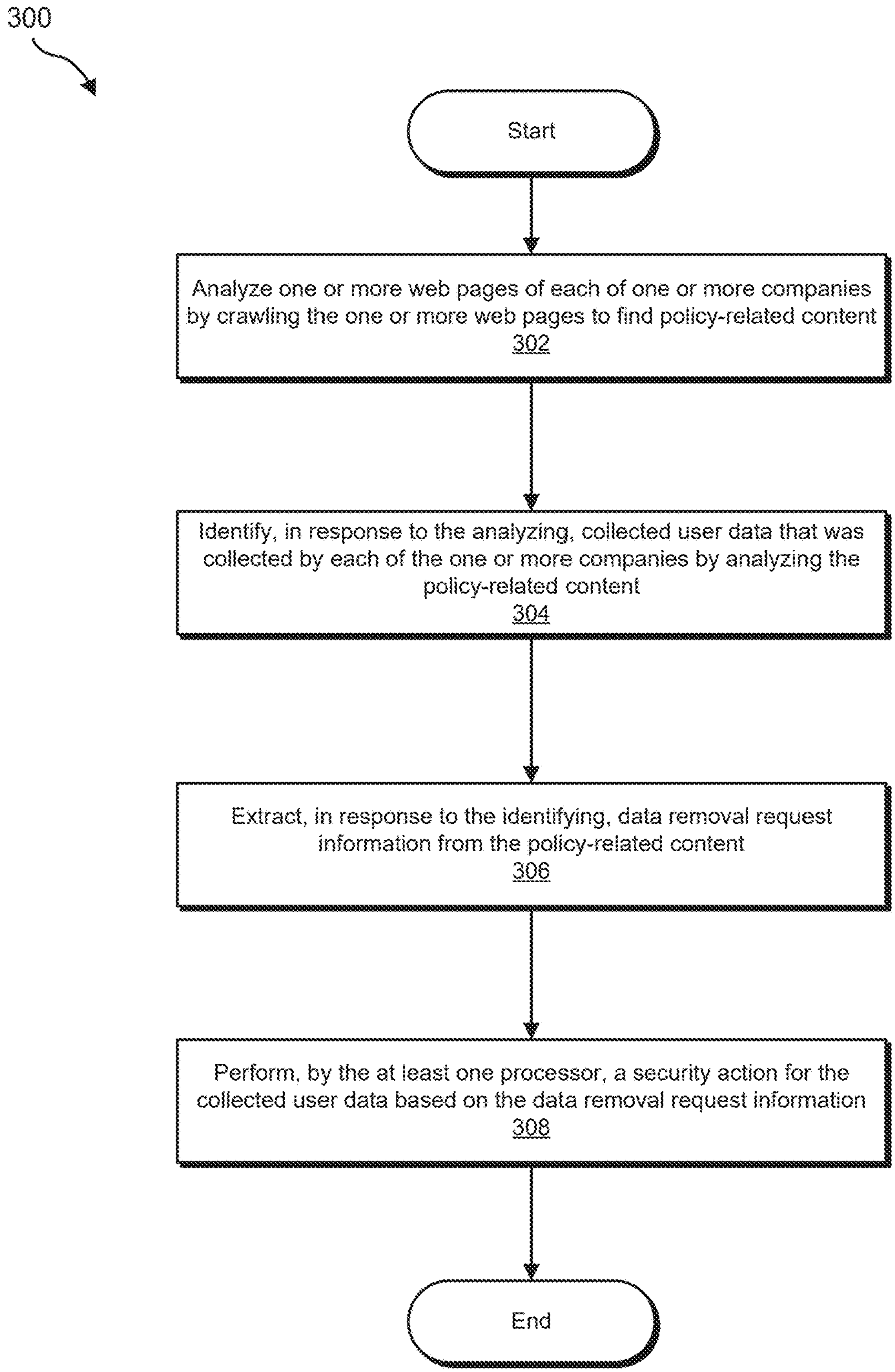
FIG. 3 is a flow diagram of an example method for managing user data collection.

FIG. 3 is a flow diagram of an example computer-implemented method 300 for managing user data collection. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may analyze, by the at least one processor, one or more web pages of each of one or more companies by crawling the one or more web pages to find policy-related content. For example, analysis module 104 may, as part of server 206 in FIG. 2, may analyze web page(s) 208 to find policies 128.

The term "policy-related content," as used herein, generally refers to a document such as a webpage or other media that may relate to or otherwise provide information about user privacy, such as user data collected by a company/organization and how to remove the collected data from the company/organization, and in some examples may be provided in compliance with privacy regulations. Examples of policy-related content include, without limitation, web documents, PDFs, text, graphics, videos, etc.

The systems described herein may perform step 302 in a variety of ways. In one example, the one or more companies corresponds to a predefined set of domains (e.g., domains 122). In some examples, the predefined set of domains may be based on commonly visited domains (e.g., a top 500 or other number of most visited domains, in some example further based on a category of domains such as by region/country, categories such as merchants, service providers, social media, etc.) and/or commonly visited companies (e.g., based on revenue, and/or other popularity metrics).

In further examples, system 100 may update the set of domains to include domains visited by a user based on analyzing user sources including at least one of user emails or user browsing history. For example, server 206 and/or computing device 202 may analyze user sources that may indicate domains visited such as emails (e.g., using email APIs to identify domains mentioned in emails, which may include emails indicating subscriptions, accounts, notifications, etc.), browsing history (e.g., using browser APIs to identify domains visited by the user such as browser history, cookie or other persistent data, etc.), apps (e.g., using APIs that indicate what domains are related to what apps), etc.

Figure 4:
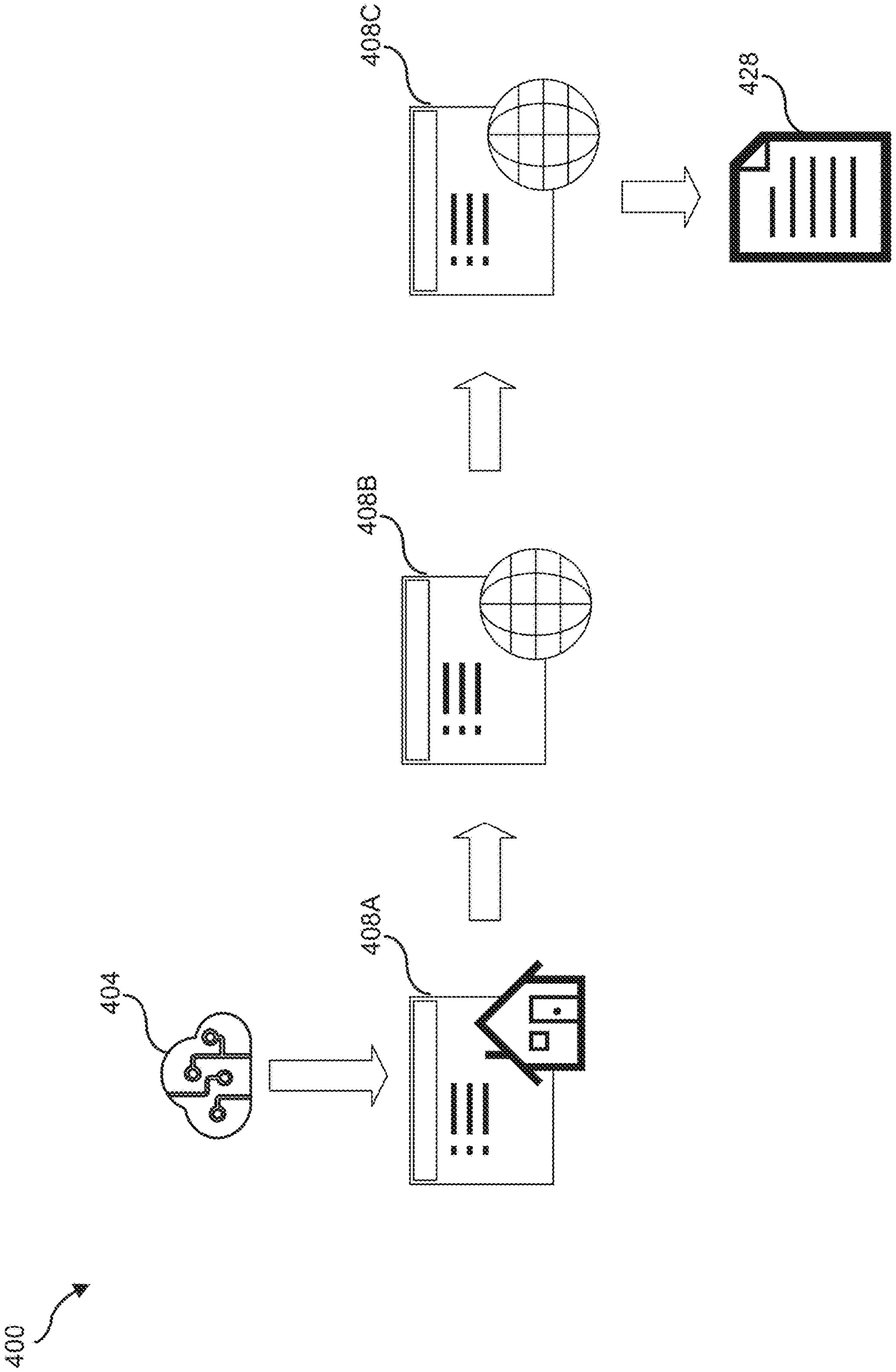
FIG. 4 is a workflow of an example crawling process.

In some implementations, crawling the one or more web pages to find policy-related content may be an adaptive process, as will be further explained with reference to FIG. 4. FIG. 4 illustrates a crawling process 400, which may be performed by an analysis engine 404 (corresponding to one or more modules 102 such as analysis module 104). Analysis engine 404 may analyze one or more domains for each company (as indicated by domains 122).

For a given company/organization, analysis engine 404 may determine a main domain page 408A (e.g., a home page of the company's web site). In some examples, analysis engine 404 may be performing analysis for a given user (e.g., to identify collected data thereof and further perform a security action) such that determining the main domain page may include identifying a location of the user and determining the main domain page corresponding to the identified user. For instance, different regions/countries may have different regulations such that policies may differ. Analysis engine 404 may use the user's location to find the most relevant policy by starting with the home page corresponding to the user's location. In other examples, analysis engine 404 may use other signals to identify the most relevant policy (e.g., identifying the version of the site most visited by the user, finding a parent company and/or subsidiary company most relevant to the user, etc.).

Analysis engine 404 may crawl (e.g., load) main domain page 408A and analyze a code (e.g., HTML or other source code) of main domain page 408A to identify at least one link element relating to the policy-related content. A link element may generally represent any element, such as a clickable element (e.g., link, button, graphic, script, etc.), that may redirect or otherwise lead to a different page. In some examples, analysis engine 404 may directly identify the link element including or otherwise associate with terms (e.g., terms 124), such as having attributes including the terms, such that following the link element may directly lead to a policy page 408C (as will be described further below). In other examples, analysis engine 404 may not directly find (e.g., matching to a high threshold to a desired term) such a link element and may use a language model (e.g., language model module 106 configured to detect policy-related terms) to identify additional related terms (e.g., secondary terms or other indirect terms or closest available terms) to find a suitable link element (e.g., having a term satisfying a threshold closeness to a desired term) to an intermediate web page 408B (e.g., rather than finding a link to a privacy page, finding a link to an informational page).

Analysis engine 404 may follow the identified link to intermediate web page 408B, where analysis engine 404 may perform a similar analysis on intermediate web page 408B to recognize the policy-related content. Analysis engine 404 may determine that intermediate web page 408B may not include the policy (e.g., by analysis with a language model) and may instead identify another link element. In some examples, analysis engine 404 may identify the link element leading to policy page 408C (as will be described further below), although in other examples, may instead find another link to a different intermediate web page. In yet other examples, (e.g., if no link satisfying the threshold closeness to desired terms is found), analysis engine 404 may instead backtrack to a previously crawled page, and use a different link therefrom, or otherwise track a set of link elements ranked by closeness and analyzed.

Analysis engine 404 may continue to evaluate intermediate web pages, for example repeatedly analyzing intermediate web pages and/or following link elements until recognizing the policy-related content (e.g., policy page 408C). However, to prevent analysis engine 404 from being stuck in a loop, continuing analysis where no result is actually available, or to otherwise prevent significant computational resources to be used for a given domain, analysis engine 404 may limit the analysis to a threshold number of intermediate web pages, such as five or other appropriate number.

Once analysis engine 404 reaches policy page 408C, analysis engine 404 may analyze policy 428 (corresponding to policies 128) to extract data as will be described further below.

Returning now to FIG. 3, at step 304 one or more of the systems described herein may identify, by the at least one processor in response to the analyzing, collected user data that was collected by each of the one or more companies by analyzing the policy-related content. For example, extraction module 106 may, as part of computing device 202 in FIG. 2, identify user data info 132 from policies 128.

The term "user data," as used herein, generally refers to data that may be used to personally identify a user. Examples of user include, without limitation, location/address data, name or other identifier data, demographic data, etc. In addition, user data terms may refer to terms that indicate or otherwise relate to user data.

The systems described herein may perform step 304 in a variety of ways. In one example, identifying the collected user data is based on a language model configured to detect user data terms, such as language model module 106. In some examples, extracting the data removal request information is based on analyzing the detected user data terms and nearby text in the policy-related content. For example, analysis engine 404 analyze policy 428 using the language model to identify user data terms, terms related to user data terms, and/or text near detected user data terms.

At step 306 one or more of the systems described herein may extract, by the at least one processor in response to the identify, data removal request information from the policy-related content. For example, extraction module 108 may, as part of computing device 202 in FIG. 2, may extract removal info 134 from policies 128.

The term "data removal request information," as used herein, generally refers to any information relevant to removing collected user data from a company's data collection. Examples of data removal request information include, without limitation, contact information (e.g., phone numbers, addresses, email addresses, submission forms, etc.) for requesting removal, instructions for removing and/or requesting removal, interfaces for removing and/or requesting removal, etc.

The systems described herein may perform step 306 in a variety of ways. In one example, extracting the data removal request information is based on detecting (e.g., using a language model) contact information from the policy-related content, such as email addresses, phone numbers, postal addresses, etc. In some examples, extracting the data removal request information may include identifying interfaces for removing the data as well as macros for automatically using the interface to remove the data.

At step 308 one or more of the systems described herein may perform, by the at least one processor, a security action for the collected user data based on the data removal request information. For example, security module 110 may, as part of computing device 202 in FIG. 2, perform a security action for the collected user data (as indicated by user data info 132) based on the data removal request information (e.g., removal info 134).

The term "security action," as used herein, generally refers to one or more computer-implemented responses to security/privacy related triggers. Examples of security actions include, without limitation, reporting/logging information, providing notifications, automatically performing remedial actions, etc. The systems described herein may perform step 308 in a variety of ways, as will be described further with respect to FIG. 5.

Figure 5:
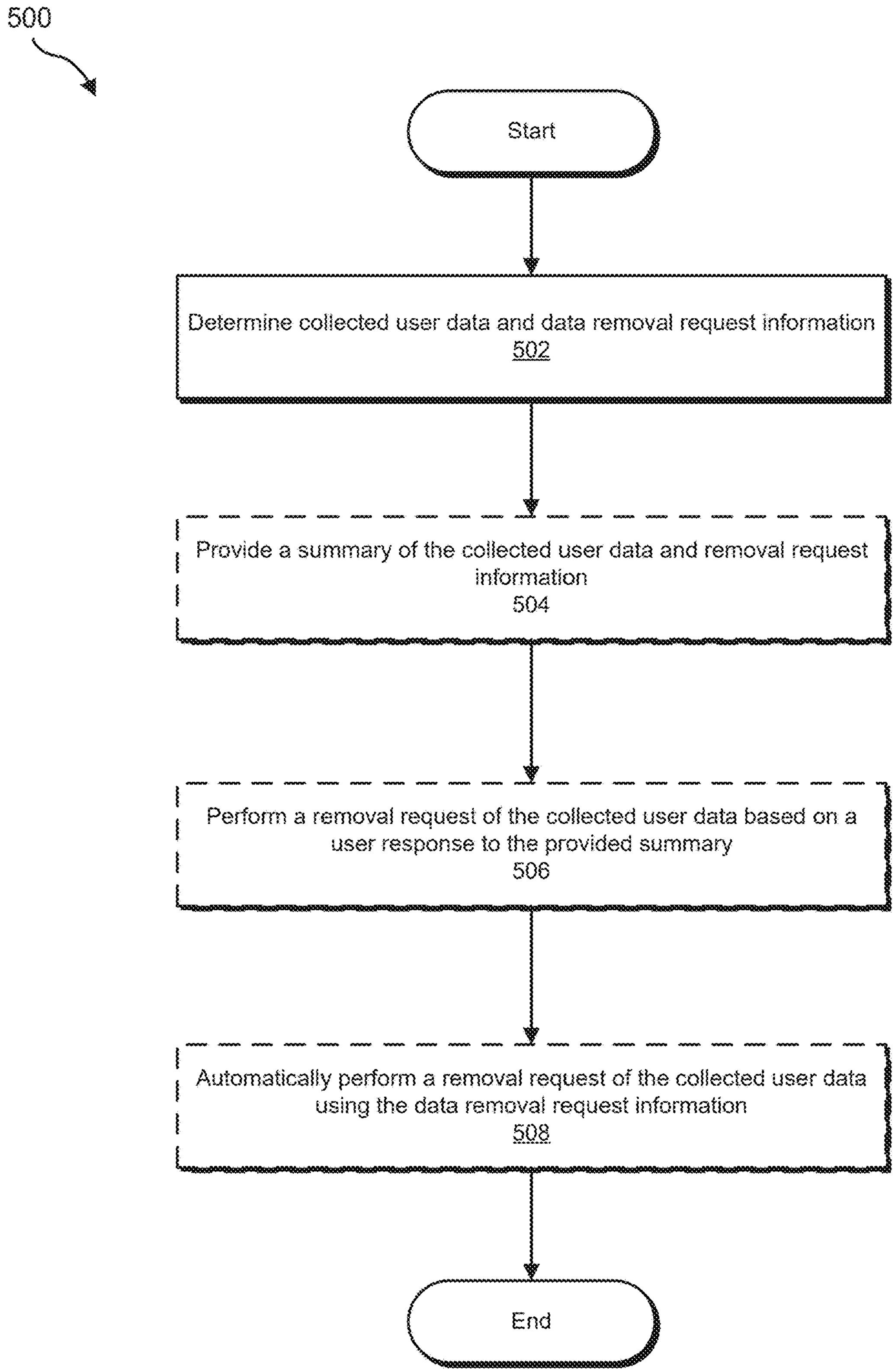
FIG. 5 is a flow diagram of an example process of potential security actions.

FIG. 5 is a flow diagram of an example computer-implemented method 500 for managing user data collection. The steps shown in FIG. 5 may be performed by any suitable computer-executable code and/or computing system, including system 100 in FIG. 1, system 200 in FIG. 2, and/or variations or combinations of one or more of the same. In one example, each of the steps shown in FIG. 5 may represent an algorithm whose structure includes and/or is represented by multiple sub-steps, examples of which will be provided in greater detail below.

As illustrated in FIG. 5, at step 502 one or more of the systems described herein may determine collected user data and data removal request information. For example, analysis module 104 and/or extraction module 108 may, as part of computing device 202 in FIG. 2, determine user data info 132 and removal info 134 (as described above).

Optionally, at step 504 one or more of the systems described herein may provide a summary of the collected user data and removal request information. For example, security module 110 may, as part of computing device 202 in FIG. 2, provide a summary of the user data collected. In some examples, security module 110 may selectively provide information. For instance, depending on the number of total domains/companies, security module 110 may rank which domains/companies are risky, have the greatest amount of collected user data, and/or other prioritizations (e.g., based on user preferences). In some examples, the summary may also include email subscription information.

Optionally, at step 506 one or more of the systems described herein may perform a removal request of the collected user data based on a user response to the provided summary. For example, security module 110 may, as part of computing device 202 in FIG. 2, may receive a user response (e.g., selection of desired data to be removed from selected domains/companies) and perform requested removals. For example, security module 110 may automatically prepare a request to the appropriate contact method for data removal and send (or allow the user to send) the request. In other examples, security module 110 may automatically use an appropriate interface to perform the removal (e.g., using the cookie management interface or other similar interface/API).

Optionally, at step 508 one or more of the systems described herein may automatically perform a removal request of the collected user data using the data removal request information. For example, security module 110 may, as part of computing device 202 in FIG. 2, perform the removal requests described herein without requiring a user response, such as based on previously defined user preferences, default preferences, suggested actions, etc.

As detailed above, the present disclosure is directed to an intelligent system for detecting data collection practices and facilitating removal requests. Users often may not know what personal information companies have collected about them, making it hard to protect their privacy. The present disclosure provides systems and methods that helps users see what data has been collected and allows them to remove any unwanted information. In one example an automated system may analyze the data collection practices of companies about users and provide recommendations for requesting its removal.

This system allows an online account cleaner that helps users understand the information companies have collected about them and take action to remove any unwanted data collection practices from the past. Since this process may, in some examples, be fully automated, the system may operate in real-time (e.g., without a significant noticeable delay to a user and/or in response to a user action) or asynchronously on a server (e.g., continuously, periodically, etc., independently from user-based triggers).

An initial step may involve identifying which companies to analyze, using a predefined set of domains and/or by collecting data directly from user sources, such as emails, through tools like email access APIs.

A next step may involve initiating a smart crawl process to locate the relevant policies. Starting with the company's main page, the system may analyze the source code (e.g., HTML/JS code) to identify potential clickable elements (e.g., links or other elements leading to another page) that lead to policy-related content.

The system may search for predefined terms associated with policies, such as "privacy," "personal data," "do not sell," "choices," etc. This set of terms may be refined using Large Language Models (LLMs) and/or other machine learning models to gain additional insights, including related hyperlinks or URLs. The process may continue until the system locates the final document (e.g., PDF, HTML, plain-text, and/or media such as images or videos).

At each crawling step, the system may evaluate whether it has reached the target document or if it needs to continue the search. To prevent infinite browsing and/or being stuck in a loop, the crawling may be stopped at certain thresholds (e.g., after five iterations, etc.).

This process may be conducted globally or tailored to specific regions (e.g., if the specific regions may have different regulations and/or policies). The system may be capable of searching based on the different countries where the company operates (e.g., based on finding the company's domain in the specific country), providing region-specific policies.

A next step may involve extracting the data that each company has collected from the user. The system may use a predefined set of terms associated with several types of information to guide its assessment. For example, "Address" information may include or otherwise refer to the physical address or parts of the address related to an individual, such as a residential and/or workplace address, delivery information, etc. Using this data, the system may conduct a pre-training phase or base prompting with relevant definitions, examples, and explanations.

In addition, this step may include searching for contact forms or links within the document that facilitate data removal requests. By analyzing both the information and the surrounding text, the system may detect URLs, emails, and other methods of contact, such as telephone numbers and/or contact addresses.

After extracting this information, the system may inform users about the data that companies may have collected about them. This may be done through various methods, such as analyzing their browsing history. The system may then propose ways to request data removal, offering both automated and manual options.

Figure 6:
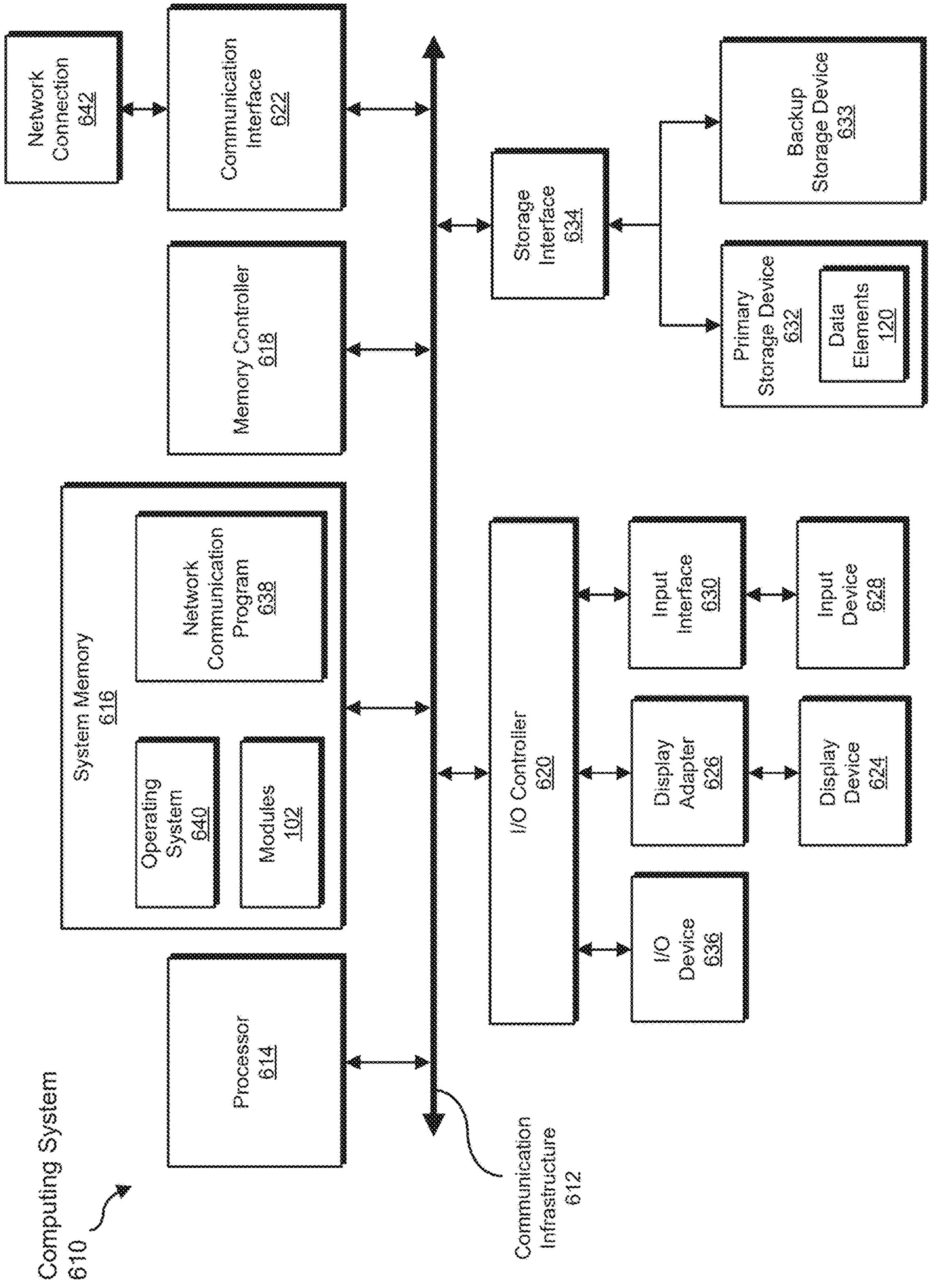
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 3). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 640 for execution by processor 614. In one example, operating system 640 may include and/or represent software that manages computer hardware and software resources and/or provides common services to computer programs and/or applications on computing system 610. Examples of operating system 640 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 636 may include and/or represent a user interface that facilitates human interaction with computing system 610. Examples of I/O device 636 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 638 for execution by processor 614. In one example, network communication program 638 may include and/or represent software that enables computing system 610 to establish a network connection 642 with another computing system (not illustrated in FIG. 6) and/or communicate with the other computing system by way of communication interface 622. In this example, network communication program 638 may direct the flow of outgoing traffic that is sent to the other computing system via network connection 642. Additionally or alternatively, network communication program 638 may direct the processing of incoming traffic that is received from the other computing system via network connection 642 in connection with processor 614.

Although not illustrated in this way in FIG. 6, network communication program 638 may alternatively be stored and/or loaded in communication interface 622. For example, network communication program 638 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, data elements 120 from FIG. 1 may be stored and/or loaded in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
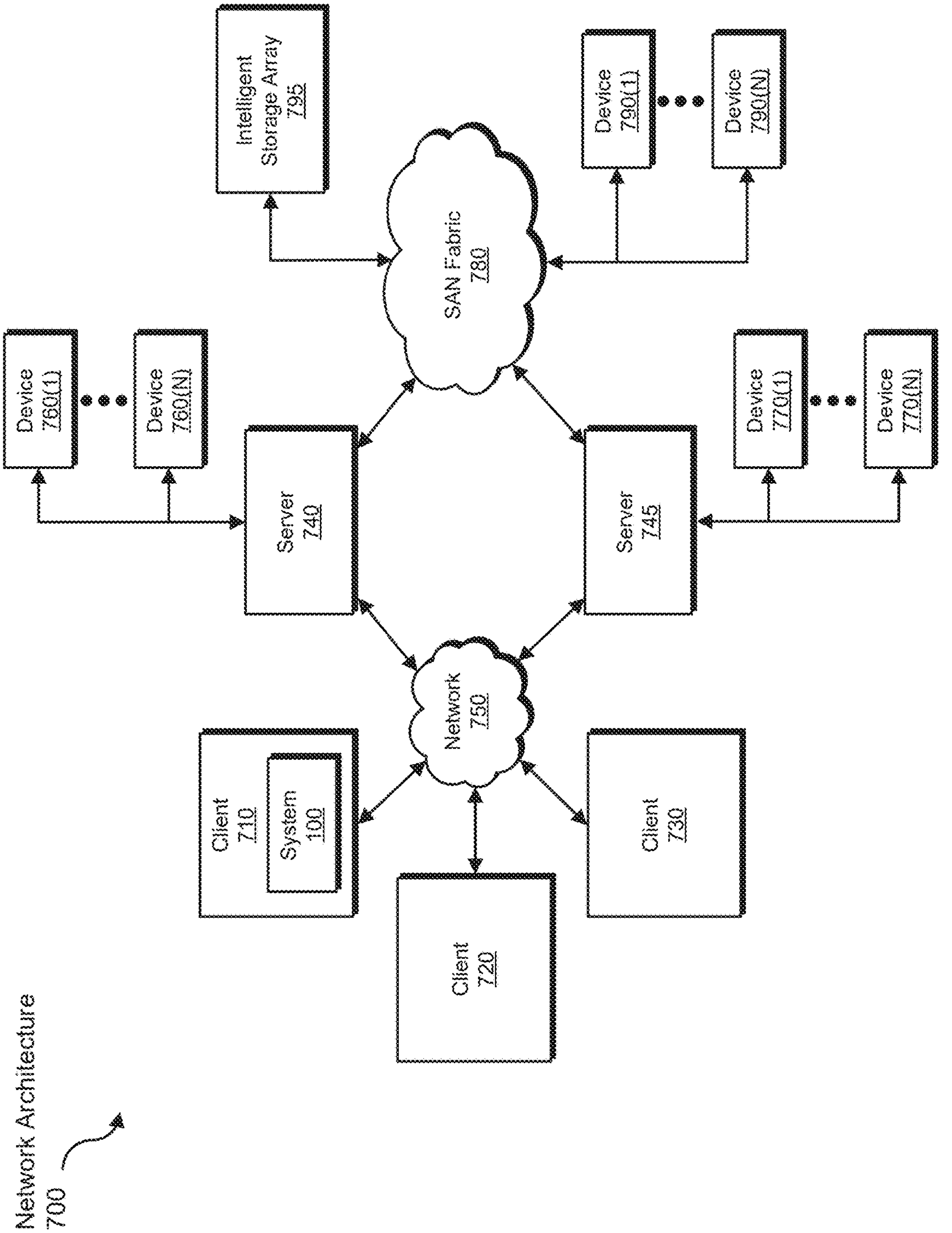
FIG. 7 is a block diagram of an example computing network capable of implementing one or more of the embodiments described and/or illustrated herein.

FIG. 7 is a block diagram of an example network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 3). All or a portion of network architecture 700 may also be used to perform and/or be a means for performing other steps and features set forth in the present disclosure.

Client systems 710, 720, and 730 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an example method for managing user data collection.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some aspects, the techniques described herein relate to a computer-implemented method for managing user data collection, at least a portion of the method being performed by a computing device including at least one processor, the method including: analyzing, by the at least one processor, one or more web pages of each of one or more companies by crawling the one or more web pages to find policy-related content; identifying, by the at least one processor in response to the analyzing, collected user data that was collected by each of the one or more companies by analyzing the policy-related content; extracting, by the at least one processor in response to the identifying, data removal request information from the policy-related content; and performing, by the at least one processor, a security action for the collected user data based on the data removal request information.

In some aspects, the techniques described herein relate to a computer-implemented method, wherein the one or more companies corresponds to a predefined set of domains.

In some aspects, the techniques described herein relate to a computer-implemented method, further including updating the set of domains to include domains visited by a user based on analyzing user sources including at least one of user emails or user browsing history.

In some aspects, the techniques described herein relate to a computer-implemented method, wherein crawling the one or more web pages to find policy-related content includes, for each of the one or more companies: determining a main domain page; analyzing a code of the main domain page to identify at least one link element relating to the policy-related content; following the identified at least one link element to an intermediate web page; and analyzing the intermediate web page to recognize the policy-related content.

In some aspects, the techniques described herein relate to a computer-implemented method, further including repeatedly analyzing intermediate web pages and following link elements until recognizing the policy-related content.

In some aspects, the techniques described herein relate to a computer-implemented method, further including repeatedly analyzing the intermediate web pages and the following link elements for a threshold number of intermediate web pages.

In some aspects, the techniques described herein relate to a computer-implemented method, wherein determining the main domain page further includes: identifying a location of a user; and determining the main domain page corresponding to the identified user; wherein the collected user data and the data removal request information corresponds to the user.

In some aspects, the techniques described herein relate to a computer-implemented method, wherein analyzing the code of the main domain page and analyzing the intermediate web page is based on a language model configured to detect policy-related terms.

In some aspects, the techniques described herein relate to a computer-implemented method, wherein identifying the collected user data is based on a language model configured to detect user data terms.

In some aspects, the techniques described herein relate to a computer-implemented method, wherein extracting the data removal request information is based on analyzing the detected user data terms and nearby text in the policy-related content.

In some aspects, the techniques described herein relate to a computer-implemented method, wherein extracting the data removal request information is based on detecting contact information from the policy-related content.

In some aspects, the techniques described herein relate to a computer-implemented method, wherein the security action includes providing a summary of the collected user data and the data removal request information.

In some aspects, the techniques described herein relate to a computer-implemented method, wherein the security action includes performing a removal request of the collected user data based on a user response to the provided summary.

In some aspects, the techniques described herein relate to a computer-implemented method, wherein the security action includes automatically performing a removal request of the collected user data using the data removal request information.

In some aspects, the techniques described herein relate to a system for managing user data collection, the system including: at least one physical processor; and physical memory including computer-executable instructions that, when executed by the physical processor, cause the physical processor to: analyze one or more web pages of each of one or more companies by crawling the one or more web pages to find policy-related content; identify collected user data that was collected by each of the one or more companies by analyzing the policy-related content; extract data removal request information from the policy-related content; and perform a security action for the collected user data based on the data removal request information.

In some aspects, the techniques described herein relate to a system, wherein the one or more companies corresponds to a predefined set of domains and the instructions further include instructions for updating the set of domains to include domains visited by a user based on analyzing user sources including at least one of user emails or user browsing history.

In some aspects, the techniques described herein relate to a system, wherein crawling the one or more web pages to find policy-related content includes, for each of the one or more companies: determining a main domain page based on a location of a user; analyzing a code of the main domain page, using a language model configured to detect policy-related terms, to identify at least one link element relating to the policy-related content; following the identified at least one link element to an intermediate web page; analyzing the intermediate web page to recognize the policy-related content; and repeatedly analyzing, using the language model configured to detect policy-related terms, intermediate web pages and following link elements until recognizing the policy-related content or until reaching a threshold number of intermediate web pages; wherein the collected user data and the data removal request information corresponds to the user.

In some aspects, the techniques described herein relate to a system, wherein: identifying the collected user data is based on a language model configured to detect user data terms; extracting the data removal request information is based on analyzing, using the language model, the detected user data terms and nearby text in the policy-related content; and extracting the data removal request information is based on detecting, using the language model, contact information from the policy-related content.

In some aspects, the techniques described herein relate to a system, wherein the security action includes at least one of: performing a removal request of the collected user data based on a user response to a summary of the collected user data and the data removal request information provided to a user; or automatically performing a removal request of the collected user data using the data removal request information.

In some aspects, the techniques described herein relate to a non-transitory computer-readable medium including one or more computer-executable instructions that, when executed by at least one processor of a computing device, cause the computing device to: analyze one or more web pages of each of one or more companies by crawling the one or more web pages to find policy-related content; identify collected user data that was collected by each of the one or more companies by analyzing the policy-related content; extract data removal request information from the policy-related content; and perform a security action for the collected user data based on the data removal request information.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive web page data to be transformed, transform the data, output a result of the transformation to detect policy information, use the result of the transformation to identify collected user data and corresponding removal information, and store the result of the transformation to perform a security action. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for managing user data collection, at least a portion of the method being performed by a computing device comprising at least one processor, the method comprising:
- analyzing, by the at least one processor, one or more web pages of each of one or more companies by crawling the one or more web pages to find policy-related content, wherein the crawling comprises determining a main domain page, analyzing a code of the main domain page to identify at least one link element relating to the policy-related content, following the identified link element to an intermediate webpage, and analyzing the intermediate web page to recognize the policy-related content;
- identifying, by the at least one processor in response to the analyzing, collected user data that was collected by each of the one or more companies by analyzing the policy-related content;
- extracting, by the at least one processor in response to the identifying, data removal request information from the policy-related content; and
- performing, by the at least one processor, a security action for the collected user data based on the data removal request information.

2. The computer-implemented method of claim 1, wherein the one or more companies corresponds to a predefined set of domains.

3. The computer-implemented method of claim 2, further comprising updating the set of domains to include domains visited by a user based on analyzing user sources including at least one of user emails or user browsing history.

4. The computer-implemented method of claim 1, wherein the main domain page comprises a home page of a company's web site.

5. The computer-implemented method of claim 1, further comprising repeatedly analyzing intermediate web pages and following link elements until recognizing the policy-related content.

6. The computer-implemented method of claim 5, further comprising repeatedly analyzing the intermediate web pages and the following link elements for a threshold number of intermediate web pages.

7. The computer-implemented method of claim 1, wherein determining the main domain page further comprises:
- identifying a location of a user; and
- determining the main domain page corresponding to the identified user;
- wherein the collected user data and the data removal request information corresponds to the user.

8. The computer-implemented method of claim 1, wherein analyzing the code of the main domain page and analyzing the intermediate web page is based on a language model configured to detect policy-related terms.

9. The computer-implemented method of claim 1, wherein identifying the collected user data is based on a language model configured to detect user data terms.

10. The computer-implemented method of claim 9, wherein extracting the data removal request information is based on analyzing the detected user data terms and nearby text in the policy-related content.

11. The computer-implemented method of claim 1, wherein extracting the data removal request information is based on detecting contact information from the policy-related content.

12. The computer-implemented method of claim 1, wherein the security action includes providing a summary of the collected user data and the data removal request information.

13. The computer-implemented method of claim 12, wherein the security action includes performing a removal request of the collected user data based on a user response to the provided summary.

14. The computer-implemented method of claim 1, wherein the security action includes automatically performing a removal request of the collected user data using the data removal request information.

15. A system for managing user data collection, the system comprising:
- at least one physical processor; and
- physical memory comprising computer-executable instructions that, when executed by the physical processor, cause the physical processor to:
  - analyze one or more web pages of each of one or more companies by crawling the one or more web pages to find policy-related content, wherein the crawling comprises determining a main domain page, analyzing a code of the main domain page to identify at least one link element relating to the policy-related content, following the identified link element to an intermediate webpage, and analyzing the intermediate web page to recognize the policy-related content;
  - identify collected user data that was collected by each of the one or more companies by analyzing the policy-related content;
  - extract data removal request information from the policy-related content; and
  - perform a security action for the collected user data based on the data removal request information.

16. The system of claim 15, wherein the one or more companies corresponds to a predefined set of domains and the instructions further comprise instructions for updating the set of domains to include domains visited by a user based on analyzing user sources including at least one of user emails or user browsing history.

17. The system of claim 15, wherein the main domain page comprises a home page of a company's web site.

18. The system of claim 15, wherein:

identifying the collected user data is based on a language model configured to detect user data terms;

extracting the data removal request information is based on analyzing, using the language model, the detected user data terms and nearby text in the policy-related content; and extracting the data removal request information is based on detecting, using the language model, contact information from the policy-related content.

19. The system of claim 15, wherein the security action includes at least one of:

performing a removal request of the collected user data based on a user response to a summary of the collected user data and the data removal request information provided to a user; or automatically performing a removal request of the collected user data using the data removal request information.

20. A non-transitory computer-readable medium comprising one or more computer-executable instructions that, when executed by at least one processor of a computing device, cause the computing device to:

analyze one or more web pages of each of one or more companies by crawling the one or more web pages to find policy-related content, wherein the crawling comprises determining a main domain page, analyzing a code of the main domain page to identify at least one link element relating to the policy-related content, following the identified link element to an intermediate webpage, and analyzing the intermediate web page to recognize the policy-related content;

identify collected user data that was collected by each of the one or more companies by analyzing the policy-related content;

extract data removal request information from the policy-related content; and perform a security action for the collected user data based on the data removal request information.

* * * * *